United States Patent [19]
Kopp et al.

[11] Patent Number: 5,910,249
[45] Date of Patent: Jun. 8, 1999

[54] METHOD AND APPARATUS FOR RECOVERING WATER FROM A SEWER MAIN

[75] Inventors: Clinton Kopp, Castle Hill; Warren Johnson, Bligh Park; Anthony Day, North Rocks; Antony MacCormick, North Ryde; Tomasz Markiewicz, Baulkham Hills; Gary Stollery, Richmond; Mark Thompson, Randwick; Brett Alexander, Croydon Park; Neil Wende, Menora, all of Australia

[73] Assignee: CRC for Waste Management and Pollution Control Limited, Kensington, Australia

[21] Appl. No.: 08/635,919

[22] Filed: Sep. 9, 1996

[30] Foreign Application Priority Data

Oct. 27, 1993 [AU] Australia ............................... PM 2060

[51] Int. Cl.⁶ ................................. C02F 9/00; C02F 1/44; B01D 36/02; B01D 61/04
[52] U.S. Cl. .......................... 210/617; 210/631; 210/641; 210/650; 210/652; 210/639; 210/636; 210/798; 210/195.2; 210/747; 210/170; 210/201; 210/202; 210/206; 210/321.69; 210/393; 210/411; 210/416.1; 210/460; 210/151
[58] Field of Search ..................................... 210/641, 636, 210/652, 333.1, 333.01, 729, 797, 798, 154, 159, 162, 206, 650, 460, 411, 321.69, 617, 393, 631, 170, 195.2, 747, 639, 920, 202, 150, 151, 201, 416.1

[56] References Cited

U.S. PATENT DOCUMENTS 1,666,164  4/1928  Chappel .

FOREIGN PATENT DOCUMENTS

| | | |
|---|---|---|
| 48493/72 | 5/1974 | Australia . |
| A-0 507 416 A1 | 7/1992 | European Pat. Off. . |
| 1352960 | 5/1964 | France . |
| 1089335 | 9/1960 | Germany . |
| 154370 | 12/1920 | United Kingdom . |
| 2114460 | 8/1983 | United Kingdom . |
| 2168907 | 7/1986 | United Kingdom . |

OTHER PUBLICATIONS

Patent Abstracts of Japan, C–4, p. 123, JP, A, 55–13103 (Mitsui Toatsu Kagaku K.K.), Jan. 30, 1980, Abstract.

Derwent Abstract Accession No. 22853C/13, Class A88 D15 J01 (JO1), JP, A, 55–22304 (Ashahi Chemical Ind. K.K.) Feb. 18 1980, Abtract.

Derwent Abstract Accession No. 129093/18, Class D15, JP, A, 3–68498 (Ebara Infilco K.K.), Mar. 25 1991, Abstract.

Patent Abstract of Japan, C–1130, p. 164, JP, A, 5–192659 (Tokyo Metropolis) Aug. 3 1993, Abstract.

Degremont, "Water Treatment Handbook", sixth edition, vols. 1 and 2, (1991), pp. 179–182, and 849.

Smith and K.S. Wilson, "Power", vol. 134, No. 3, issued Mar. 1990, Triple–membrane treatment enhances feedwater quality, pp. 37–38.

Patent Abstract of Japan, C–1063, p. 122, JP, A, 5–7886, (Ebara Infilco Co. Ltd), 19 Jan. 1993, Abstract and figure, components, 8, 9, 11.

*Primary Examiner*—Thomas M. Lithgow
*Attorney, Agent, or Firm*—Knobbe, Martens, Olson & Bear, LLP

[57] ABSTRACT

A process and apparaus for recovery water from raw sewage extracted directly from the sewer including a screen(2) operable to obtain from raw sewage a screened effluent having a maximum particle size of no more than 900 microns. The apparatus also comprises a first membrane separator(5) which is operable to filter the suspended solids from some or all of the screened effluent. The process also includes a second membrane separator preferably in the form of reverse osmosis filter(8).

31 Claims, 3 Drawing Sheets

METHOD AND APPARATUS FOR RECOVERING WATER FROM A SEWER MAIN

FIELD OF THE INVENTION

The present invention relates to a process and apparatus for recovering water from raw sewage extracted directly from a sewer main.

The invention has been developed primarily for producing water of industrial and agricultural use quality level and will be described with reference to this application. However, it should be appreciated that the invention may be adapted to provide a potable water supply.

BACKGROUND OF THE INVENTION

Various processes and systems have been proposed for recovering water from sewer mains. However, in view of the high levels of organic matter in sewage, such systems have always previously included a settlement process, more usually as part of, or in conjunction with, some form of biological digestion process.

Some of these prior art systems have included an anaerobic processing stage which generally requires the slurry to be stored in a holding tank or chamber without oxygenation. Similarly, the preferred aerobic treatment often used in these systems is the activated sludge process which again necessitates storing the slurry in some form of tank arrangement. Air is then injected into the slurry by various means to promote biological digestion by aerobic bacteria.

After the biological treatment, the resulting effluent of the prior art is further treated in various known manners including processes such as chemical coagulation and flocculation, multi-media sand filtration, and chlorination, etc.

Systems of the kind referred to above have several disadvantages. Firstly, the inclusion of any form of settlement or holding tank will not only potentially increase the processing time, it immediately makes the system bulky and cumbersome, thereby placing restrictions on where and how the treatment plant is located. Furthermore, odour control problems are often encountered when using such systems.

Where long residence time biological treatment stages are included, there is the additional disadvantage of needing to keep the system operating at all times so as to preserve the growth of bacteria required for the various biological processes to work effectively. With activated sludge systems, this means that the expense associated with injecting air and operating these systems must still be incurred even when additional water is not required, such as during periods of heavy rain.

It is an object of the present invention to provide a process and apparatus for recovering water from raw sewage extracted from a sewer, that overcomes or at least ameliorates one or more of the above discussed disadvantages of the prior art.

DISCLOSURE OF THE INVENTION

According to a first aspect of the invention there is provided a process for recovering water from raw sewage extracted directly from a sewer, said process comprising the steps of:

directly screening the raw sewage to obtain screened effluent having a maximum particle size of between 50 and 900 microns; and filtering some or all of the screened effluent through a microfiltration membrane separation stage for the removal of suspended solids without an intermediate long term biological treatment stage.

Preferably, the process further comprises the steps of filtering some or all of the effluent from the first membrane stage through a second membrane separation stage for the removal of selected soluble substances. Optionally, the process further includes the step of chemically dosing the effluent from the first membrane stage to prevent precipitation of soluble organic substances in the solution prior to passing through the second membrane stage.

Desirably, the preferred first membrane separation stage is a continuous microfiltration process. The preferred second membrane separation stage will vary according to the quality of the in-feed and the required quality level of the final effluent and may include ultrafiltration, nanofiltration or reverse osmosis, these processes being used either alone or in combination.

Preferably, the process includes the additional steps of periodically washing or back-washing each of the screening and membrane separation stages, and, optionally returning the washing media and accumulated solids directly back to the sewer. In one preferred form, the washing media from the first and/or second membrane separations stages are returned in a manner whereby they are first used to assist in cleaning the screen.

Preferably, the screen aperture sizes are in the range of 100 to 500 microns. In one useful form of the process which uses microfiltration followed by reverse osmosis, a 200 to 250 micron screen is preferred.

Washing media for the ultrafiltration or reverse osmosis stage may include chemical cleaning agents.

In a preferred form, the screening is conducted within the sewer main or a preferably closed-in well diverted directly therefrom, via a substantially self-cleaning screen system such as a screen made in accordance with the third aspect of the invention. Other suitable screens include rotating belt or drum screens, bag screens and the like. Desirably, the screen also includes washing means comprising nozzles or jets or the like that direct water and/or air or other washing medium to the screen surface.

The use of an in-sewer screen has several advantages in that it is easier to control odour, handling of the screenings is substantially eliminated and only one pumping stage will be required to the microfiltration stage.

In one preferred form, the process also includes the step of passing the screened effluent through a short residence time trickle bed suspended growth filter arrangement prior to the microfiltration stage.

Desirably, the process also includes the step of dosing the screened effluent with a coagulant prior to the microfiltration stage.

In a further embodiment, the effluent from the second membrane separation stage may be sterilised, preferably by passing ozone therethrough.

According to a second aspect of the invention there is provided an apparatus for recovering water from raw sewage extracted directly from a sewer, said apparatus comprising:

screening means operable to obtain directly from raw sewage a screened effluent having a maximum particle size of between 50 and 900 microns; and microfiltration membrane separation means operable to filter the suspended solids from some or all of the screened effluent without an intermediate long term biological treatment stage.

Desirably, the apparatus further comprises second finer membrane separation means operable to filter selected soluble substances from some or all of the effluent from the first membrane separation means.

Optionally, the apparatus also includes chemical dosing means to treat the effluent from the first membrane separation stage so as to prevent precipitation of soluble organic substances in solution.

Desirably, the apparatus also includes means to periodically wash or back-wash each of the screening and membrane separation stages and return the washing media and accumulated solids back to the sewer.

Preferably, the apparatus also includes means by which some or all of the process preferments of the first aspect of the invention are obtained.

According to a third aspect of the invention there is provided a submersible screening device to screen raw sewage extracted directly from a sewer, said device comprising:

- a screen inclined to the horizontal and/or to the direction of sewage flow, said screen defining a portion of a surface of an enclosed chamber and being adapted to permit passage of screened effluent having a particle size of no more than 900 microns from an outer surface of the screen, through the screen and into said chamber;
- means disposed within said chamber to direct air generally toward an inner surface of the screen to assist in removal of solids that accumulate on the outer surface of the screen by applying pressure to the inner surface of the screen and causing vibration of the screen's outer surface;
- means to extract a screened effluent from said chamber; and
- an air bleed-off outlet disposed adjacent an upper edge of the screen to facilitate venting of excess air in said chamber.

Desirably, a pump is provided within the chamber to extract and divert the screened effluent.

Preferably, the screen also includes means to direct cleaning water or other washing media to the screen. This may include means to direct washing media from the inner surface of the screen and out through the screen and/or directly to the outer surface of the screen.

The screen element of the device may be static such as sieve bends, bag screens, floating bag screens, enclosed in-line screens etc, or dynamic screens such as rotating drums or rotating disc screens and the like.

Optionally, the screen may also include some form of scraping mechanism selectively operable on the outer surface of the screen. In another form, the device may include means to vary the inclination of the screen to the general sewage flow direction such that the tangential flow of sewage assists in cleaning the screen. Alternatively, the device may be disposed so as to utilise any turbulent sewage flow in the well to clean the screen by, for example, placing the screen under the inlet.

In another embodiment the screen includes mechanical means to vibrate the screen and dislodge accumulated screenings.

The cleaning air directed to the screen also serves as a gas/odour scrubber. In one preferred form, intermittent high pressure air blasts are used to periodically dislodge screenings and generally continuous lower pressure air jets operate to deodorise the screened effluent. In this way odours are kept substantially in the sewer, allowing transfer of screened, aerated sewage to the surface for further treatment.

BRIEF DESCRIPTION OF THE DRAWINGS

A preferred embodiment of each aspect of the invention will now be described, by way of example only, with reference to accompanying drawings in which.

PREFERRED EMBODIMENT OF THE INVENTION

Figure 1:
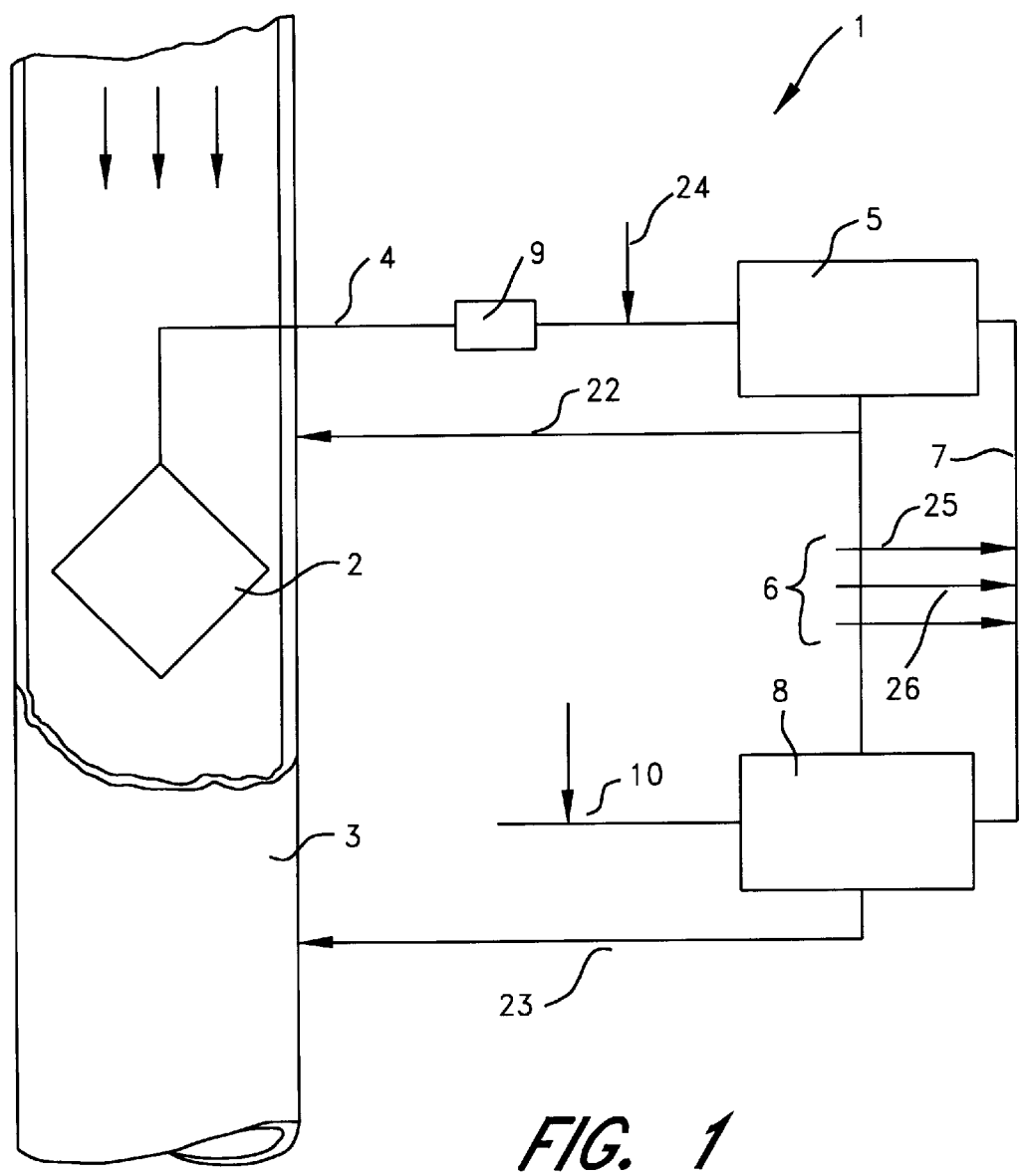
FIG. 1 is a schematic flow diagram of a first embodiment process and apparatus according to the first and second aspects of the invention.

Referring first to FIG. 1, the water recovery apparatus 1 comprises a screening device 2 illustrated in location either directly in a sewer 3 or a well diverted therefrom, the screening device being connected by piping 4 to a first membrane separation stage comprising a continuous microfiltration (CMF) unit 5.

Chemical dosing means 6 are optionally connected with the piping 7 that carries the effluent from the microfiltration units 5. The piping 7 extends from the microfiltration unit 5 to a second membrane separation stage 8 which in the form illustrated comprises a reverse osmosis (RO) filter.

An optional trickle bed suspended growth filter 9 is illustrated intermediate the screen 2 and microfiltration unit 5 with an optional ozonation process 10 adjacent the outlet from the RO unit 8.

Figure 2:
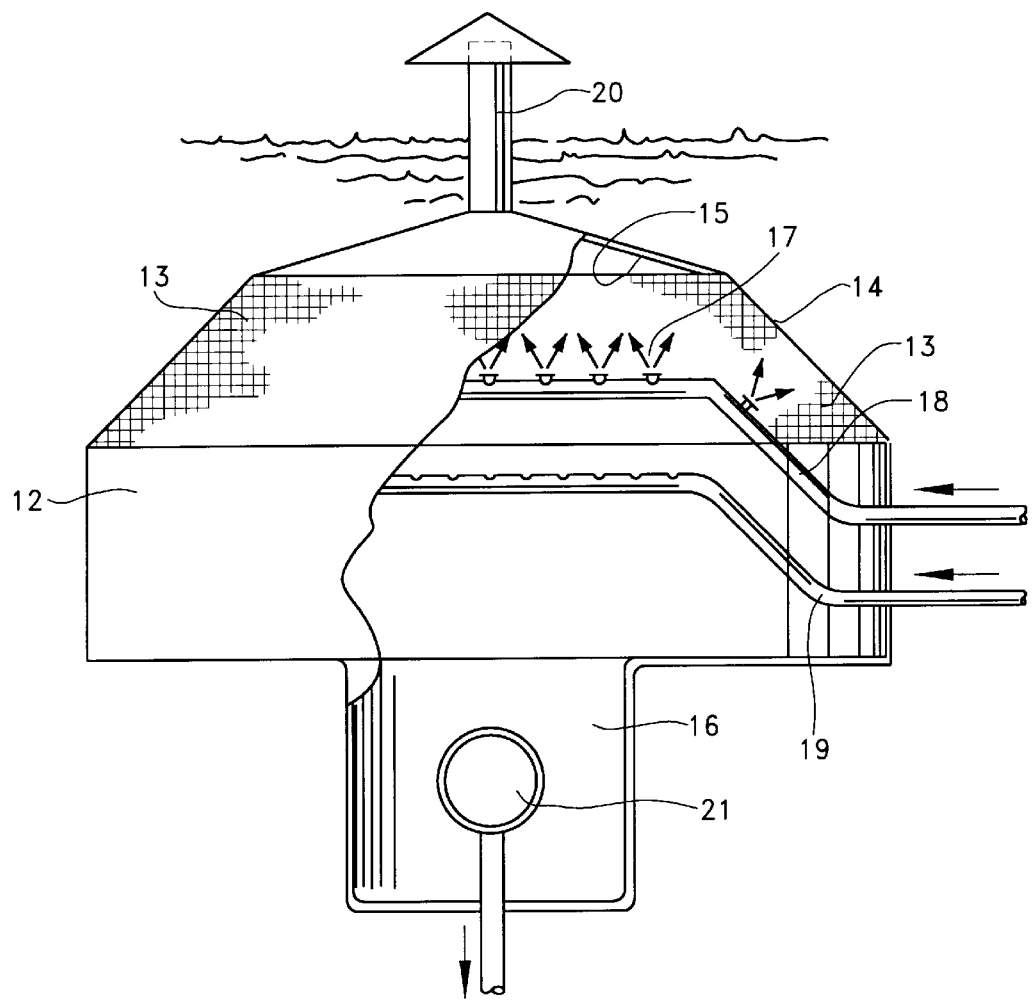
FIG. 2 is a schematic flow diagram of a first embodiment sewage screen in accordance with the third aspect of the invention.

Referring next to FIG. 2, there is shown a preferred screen arrangement 2 made in accordance with the second aspect of the invention. The screening device 2 preferably has a generally mushroom shaped construction, the top outer surface 12 supporting a filter screen 13 that has an outer surface 14 and an inner surface 15. The screen 13 defines part of a chamber shown generally at 16. The screen in this preferred form has a mesh size selected to result in a screened effluent having a maximum particle size of around 200 to 250 microns.

Disposed below the screen 13 are a plurality of optional cleaning liquid nozzles 17 arranged on a manifold 18 which are preferably connected to a high pressure water or cleaning agent source (not shown). High pressure cleaning liquid from the nozzles can be directed toward the screen surface to assist in the removal of accumulated debris and thereby prevent blockages. Optionally, the screen is also rotatable to assist in cleansing of the screen.

Illustrated immediately below the liquid nozzles and screen are means to admit high pressure air into the chamber 16 shown generally at 19. Air is periodically or continuously admitted to the chamber preferably using nozzles, perforations or micro-venturis or the like in a manner whereby the air is directed generally toward the inner surface of the screen. An air bleed-off tube 20 may also be provided to ensure air flow is continuous when applied even when the screen is blocked. The air serves not only to aerate the screened effluent and/or scrub the odour from the gaseous portion of the effluent, but also contributes in a surprisingly effective manner to cleaning the screen by applying pressure from the inner surface causing the sludge to be driven away from the sieve's outer surface 14 and by causing vibration of the screen surface helping to dislodge solids.

Finally, the stem of the mushroom shaped screening arrangement houses a submersible pump 21 which directs the screened aerated and scrubbed sewage effluent to piping 4 and optionally onto the trickle bed filters 9 or direct to the microfiltration units 5. Suitable microfiltration units may be selected from the range of products produced by Memtec Ltd and sold under the registered trade mark "Memtec" such as the M10 CMF unit.

The CMF units 5 and RO units 8 each include means for chemically washing or back-washing the various devices. The washing media and accumulated solids washed from these units is preferably directed back to the sewer via conduits 22 and 23 respectively. This can be diverted onto or toward the outer surface 14 of the screen 13 to assist in keeping the screen clear.

The main steps and optional variations in the process and apparatus in accordance with the first aspect of the invention will now be described in more detail.

Commencing with the screening that forms part of the treatment process of the first aspect of the invention, it will be appreciated that the embodiment illustrated in FIG. 2 is only one preferred form and that it will be possible to achieve the design criteria with a number of physically different screen embodiments. In this regard, commercially available rotating drum screens, belt screens and various agitating screen arrangements could be modified to meet the requirements of the invention. Similarly, a generally stationary screen that can be inclined relative to the sewage flow for cleaning purposes can also be used.

In most cases the preferred form of the screen will be configured to provide a filtration velocity therethrough of preferably less than 1.0 $m^3/s/m^2$ and a resulting filtrate having a maximum particle size of no more than approximately 900 microns and more ideally around 200 to 250 microns. It will be appreciated that these figures are in part dependent on the particular apparatus or models selected.

It will also be appreciated that whilst location of the screen 2 within the sewer 3 or an adjacent well is the preferred arrangement, another option is to pump the sewage from the sewer to an above-ground screening arrangement.

The total number of pumps required will depend very much on the topography of the sewage extraction location and whether or not the selected filtration units incorporate their own pumping systems. Generally, however, it is believed that an additional pumping stage is required where the screening is performed external to the sewer.

Another optional procedure in the process is a coagulant dosing stage which would occur prior to the microfiltration stage 5 at point 24. Where a biological trickle bed filter arrangement is also included in the process, the coagulant dosing is desirably performed downstream of this biological treatment as shown.

The chemical dosing stage shown generally at 6 may comprise a number of known treatments such as injection of an anti-scalant at location 25 followed by injection of an organics dispersant at location 26 and/or injection of disinfectant e.g. chlorine at location 27 to control biological growth.

In use, effluent is drawn through the screening device 2 and pumped via conduit 4 either directly to a microfiltration unit 5 or an optional trickle bed filter 9. Depending on the nature of the sewage, the effluent may be dosed with a coagulant prior to the microfiltration stage.

The microfiltration serves to substantially reduce the quantity of suspended solids. Where the microfiltration units appear to be having difficulties in processing the in-feed, a certain degree of cross-flow through the microfiltration units can be tolerated. When the microfiltration units become clogged, the system automatically performs a back-washing operation and the back-wash is preferably returned to the sewer via conduit 17.

The BOD of the effluent exiting the microfiltration stage may still be fairly high, in which case it is desirable to inject an organic dispersant prior to passing the microfiltered effluent through the RO or other second membrane separation stage. This serves to prevent the soluble organic matter from precipitating out of solution and blocking the membranes of the RO. The final effluent exiting the RO will have a substantially reduced BOD and may optionally be further treated/sterilised by injection of chlorine or ozone.

The results of preliminary tests incorporating pre-screening of raw sewage followed by CMF and then RO are as follows.

EXAMPLE 1

Pre-Screened Raw Sewage to CMF and RO

Raw sewage, taken directly from the sewage treatment plant inlet, was screened to 200 micron using a bag filter. The screened sewage was then directed to a model "3M1 Microcompact" manufactured by Memtec Limited, which contains three membrane modules. The unit was fitted with a centrifugal feed pump with a maximum pressure of 120 kPa and was operated in the "dead-end" mode. The microfiltration membrane is made from polypropylene and has a nominal pore size of 0.2 microns. The system operates by filtering from the outside of hollow fibres to the inside, thus accumulating a filter cake on the surface of the membrane. This cake is periodically removed using a compressed air/liquid back-wash. During back-washing air is forced through the membrane from the inside of the hollow fibre to the outside. This dislodges the filter cake which is then washed away by a liquid sweep on the outside of the fibres.

The microfilter was run for a total of 124 hours at feed temperatures ranging from 19 to 23° C. and pH from 7.5 to 9.0. Back-washing was set to occur automatically every 18 minutes. The flowrate from the microfilter was initially 300 L/h but was later reduced to 200 L/h. Chemical cleaning of the membrane using caustic and surfactants was carried out every 24 hours to maintain the flowrate.

Filtrate from the microfilter was directed to an Admiral SW700 reverse osmosis unit (RO) manufactured by Memtec Limited. The reverse osmosis unit was fitted with a 2.5 inch ×25 inch cellulose acetate reverse osmosis membrane.

The reverse osmosis unit was run for a total of 93.5 hours at an average permeate flux of 17.6 GFD (US gallons/sq. foot/day) with a concentrate flow of 6 L/min. This gave an average recovery of 7.85%. The operating pressure of the system was kept constant at a value of 1800 kPa throughout the trial. Concentrate recycle was used to maintain the required flow in the RO unit. Chlorine (in the form of sodium hypochlorite) was added at 1 ppm to the RO feed to control biological fouling.

Figure 3:
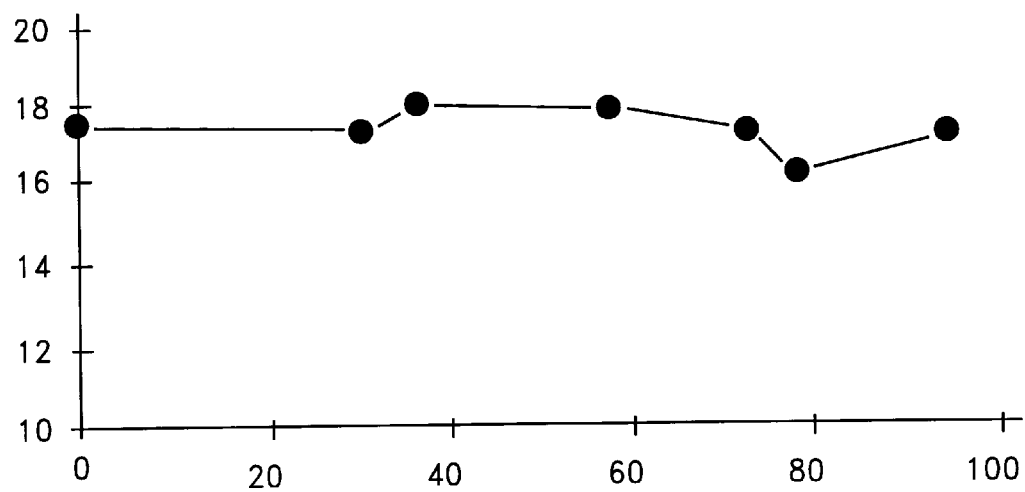
FIG. 3 is a graph illustrating the variation in RO permeate flows with run hours for the system described in Example 1 made in accordance with the first and second aspects of the invention.

Normalised permeate flows for the RO are listed in the table below and shown graphically in FIG. 3.

| Run hours | Permeate flow (GFD) |
|---|---|
| 30.8 | 17.6 |
| 32 | 17.6 |

-continued

| Run hours | Permeate flow (GFD) |
|---|---|
| 36.6 | 18.1 |
| 56.6 | 18.1 |
| 72.3 | 17.6 |
| 78.5 | 16.5 |
| 93.5 | 17.4 |

Figure 4:
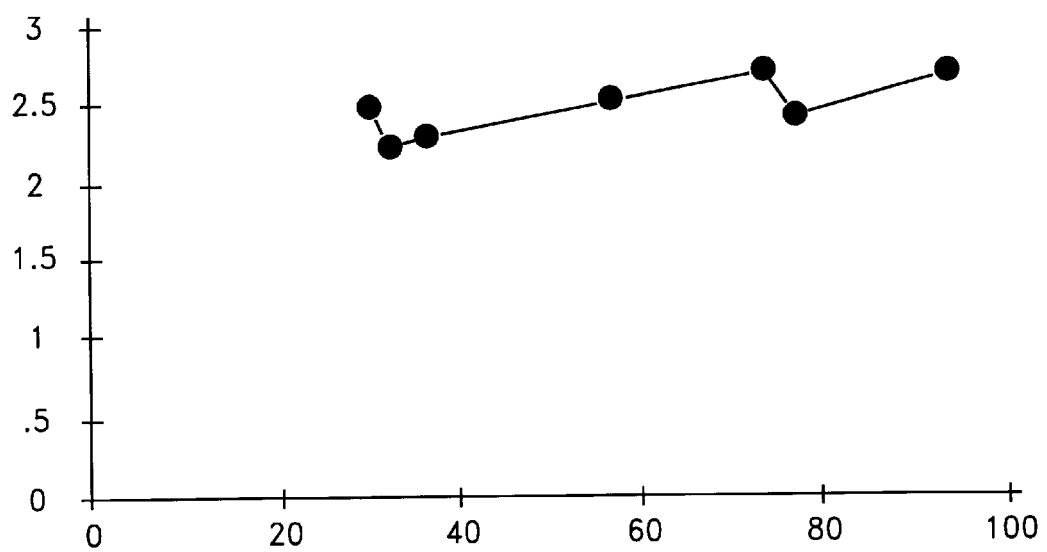
FIG. 4 is a graph illustrating the variation in salt passage with run hours for the example referred to in FIG. 3.

The data shows a slight variation in normalised flow but generally stable performance. This is supported by the salt passage data listed in the table below and presented graphically in FIG. 4, which varied between about 2.2% and 2.7%.

| Run hours | Salt Passage % |
|---|---|
| 30.8 | 2.53 |
| 32 | 2.22 |
| 36.6 | 2.3 |
| 56.6 | 2.53 |
| 72.3 | 2.72 |
| 78.5 | 2.45 |
| 93.5 | 2.73 |

The ability of the system to reject contaminates from the sewage was also studied. This involved analysis of the screened raw sewage, microfiltered effluent (filtrate), and reverse osmosis effluent (RO permeate). Samples were analysed for bacteria (faecal coliforms), Chemical Oxygen Demand (COD), Biochemical Oxygen Demand (BOD), Nitrates, Ammonia, Total Kjeldahl Nitrogen (TKN), and Total Phosphorus. Averaged results are summarised in the table below.

| Analysis | Screened raw sewage feed | Micro-filter filtrate | RO % permeate | % Removal |
|---|---|---|---|---|
| Faecal coliforms cfu/100 mL | 8 × 10$^6$ | 0.5 | 0.8 | 100 |
| COD mg/L | 376 | 102 | 14 | 96 |
| BOD mg/L | 141 | 52 | 15 | 89 |
| Nitrate mg/L as N | 0.05 | 0.01 | 0.01 | 72 |
| Ammonia mg/L as N | 33.2 | 29 | 1.5 | 95 |
| TKN mg/L as N | 43.6 | 34.4 | 2.2 | 95 |
| Tot. Phos. mg/L P | 9.6 | 9.7 | 0.3 | 97 |
| TDS mg/L | 408 | 408 | 18 | 96 |
| Conductivity uS/cm@25° C. | 963 | 929 | 30 | 97 | number of samples = 5

Conclusion of Treatment System Test

The data shows that operation of the microfilter on screened raw sewage is feasible and that the filtrate produced provides a suitable feed for reverse osmosis. Effluent (permeate) from the reverse osmosis process is of near potable quality and suitable for many reuse applications. The process has also been shown to be easily stopped and started with no apparent adverse affects. It should also be noted that the average permeate flux of 17.6 achieved to date is extremely good, as this is almost twice the accepted industry norm. Surprisingly, it was also unnecessary to chemically clean the RO unit during the albeit limited duration of the tests.

It will be immediately apparent to those skilled in the art that the process and apparatus according to the first aspect of the invention provides a system which is substantially more compact and more flexible than any water from sewage mains extraction process previously known.

The advantages arise at least in part from the substantial elimination or reduction in the need for any settlement holding tank type treatment. This ability to optionally eliminate the need for any long term and cumbersome settlement or bio-digestion process arises from the unexpected discovery that screened raw effluent can be successfully processed directly by microfiltration.

Turning next again to the screening device made in accordance with the third aspect of the invention, it will be appreciated that the device is not limited to the specific form described. More particularly, the screen element of the device, to the rear side of which the cleaning air is directed, may be of the static kind such as used in sieve bends, bag screens or enclosed screens of the kind described, or dynamic screens such as rotating drum screens or rotating disc screens and the like.

The results of preliminary tests conducted on the preferred form of the pre-screen device as illustrated in FIG. 2 are as follows.

EXAMPLE 2

Pre-Screen Operation

A prototype pre-screen, containing water sprays and an air distribution system for aeration as described in FIG. 2, was manufactured and fitted with a 500 micron aperture screen with an open area of 45.5%. The total screen area was 0.26 m$^2$. The screen was operated at a constant flow of 33 L/min. Screening velocities of 0.002, 0.004 and 0.008 m$^3$/s/m$^2$ were tested by varying the exposed screen area.

The screen was submerged in a well in the form of the inlet forebay of a sewage treatment plant such that the entire screen device was completely covered by raw, untreated sewage. Without the aeration activated and at a flow of 33 L/min and a screening velocity of 0.004 m$^3$/s/m$^2$ the screen was able to operate for approximately 15 minutes before blocking up with fibrous material and other solids. With aeration activated the screen was operated for over 90 minutes without any signs of blockage. Turning the aeration off resulted in the screen blocking after a further 17 minutes. Once blocked the screen could be cleaned effectively using the water sprays, but was more readily cleaned using a combination of water sprays and aeration.

The above was repeated at a screen velocity of 0.008 m$^3$/s/m$^2$. Without aeration the screen blocked after approximately 3 to 4 minutes. However, by applying short bursts of aeration, lasting about 10 seconds, every 3 minutes the screen was effectively cleaned whilst submerged allowing operation to continue.

Samples collected showed a total solids reduction of about 30 to 40%.

EXAMPLE 3

Pre-Screen Operation

In this test the screen used in Example 2 was refitted with a 250 micron aperture screen with an open area of 50% and tested at a filtration velocity of 0.003 m$^3$/s/m$^2$.

Without aeration screen blockage occurred after about 2 minutes of operation. By applying 10 second bursts of aeration every 2 minutes or by leaving the aeration on continuously, screen operation was continued for 75 minutes without blocking. Once blocking occurs (either by insufficient aeration or no aeration) the screen could be cleaned by turning the water sprays on for about 10 to 30 seconds.

Turbulence in the forebay, that occurred when feed was intermittently sent to the sewage treatment plant from one of the pumping stations, also aided in cleaning the screen as screened material was easily washed from the screen surface. This highlighted the benefit of designing the screen to take advantage of natural flows and turbulence that may be present in the sewer main. Alternatively, artificial turbulence and tangential screen flows could be achieved by careful design of the sump or pit in which the screen is located.

EXAMPLE 4

Pre-Screen Operations

The pre-screen of Example 2 was fitted with an 850 micron screen with an open area of 50% and tested at a screening velocity of 0.003 $m^3/s/m^2$.

The screen operated with no aeration and no water spray for a total of 34 minutes before blocking. With aeration activated, the screen operated for over an hour without any signs of blocking. Samples taken showed a solids removal of 20%.

After a total of 90 minutes operation the screen was removed and examined. Whilst the bulk of the screen was clean some sections that were not contacted by spray water, had fibrous material that was becoming entangled in the screen and was not easily removed. This had not been a problem on the finer screens tested (Examples 2 and 3) as fibres and other solids tended to lay on the surface and could easily be removed using air and/or water.

Conclusion of Pre-Screen Tests

All the screens tested were effective at removing fibrous material with the finer screens (250 to 500 microns) being easier to clean. Solids removal ranged from approximately 30% to 40% for the 250 micron screen to about 20% for the 850 micron screen.

The water sprays were capable of keeping the screen clean although it was found to be most effective when used in conjunction with the aeration.

The aeration system provided a well aerated sewage (evidenced by fine bubbles in samples collected) and also assisted in maintaining a clean screen.

It has been found with screens according to this third aspect of the invention, that directing air and/or cleaning fluid to the inner side of the screen remote from the surface on which the sludge accumulates, provides a surprisingly effective method of keeping the screen clean.

With the screens having apertures in particular of around 500 microns or less, the sludge is seen to build up when no air is supplied. However, once the aeration is activated, the accumulated sludge simply slides off the screen in fragmented sheets. When the air is applied continuously there does not appear to be any substantial build up of sludge.

Although the invention has been described with reference to specific examples, it will be appreciated by those skilled in the art that the invention may be embodied in many other forms.

We claim:

1. A process for recovering water from raw sewage extracted directly from a sewer, said process comprising the steps of:
    directly screening the raw sewage to obtain screened effluent having a maximum particle size of between 50 and 900 microns; and
    filtering some or all of the screened effluent through a microfiltration membrane separation stage for the removal of suspended solids without an intermediate long term biological treatment stage.

2. A process according to claim 1 wherein the screen has aperture sizes in the range of 100 to 500 microns.

3. A process according to claim 1 wherein the screen has aperture sizes in the range of 200 to 250 microns.

4. A process according to claim 1 further comprising the step of filtering some or all of the effluent from the microfiltration membrane separation stage through a second finer membrane separation stage for the removal of selected soluble substances.

5. A process according to claim 4 further comprising the step of chemically dosing the effluent from the microfiltration membrane separation stage to prevent precipitation of soluble organic substances in the solution prior to passing through the second membrane stage.

6. A process according to claim 1 wherein the microfiltration membrane separation stage is a continuous microfiltration process.

7. A process according to claim 4 wherein the second membrane separation stage is a reverse osmosis process.

8. A process according to claim 1 further including the step of periodically washing or back-washing the screening and membrane separation stage or stages and returning the washing media and accumulated solids directly back to the sewer.

9. A process according to claim 8 wherein the washing media is returned in a manner whereby it is used to assist in cleaning the screen.

10. A process according to claim 1 wherein the screening process is conducted within the sewer main or a well that is diverted directly from the sewer main.

11. A process according to claim 1 wherein the screening stage uses a static screening device.

12. A process according to claim 1 wherein the screening stage includes the step of continuously or intermittently applying a washing fluid to the screen to keep it clean.

13. A process according to claim 1 further including the step of passing the screened effluent through a low residence time trickle bed suspended growth filter or other low residence time biological treatment process prior to the microfiltration stage.

14. A process according to claim 1 further including the step of dosing the screened effluent with a coagulant prior to the microfiltration membrane separation stage.

15. A process according to claim 1 including a final sterilisation stage.

16. A process according to claim 1 including a stage for disinfecting effluent from the microfiltration membrane separation process to prevent biogrowth in the second membrane separation process.

17. An apparatus for recovering water from raw sewage extracted directly from a sewer, said apparatus comprising:
    screening means operable to obtain directly from raw sewage a screened effluent having a maximum particle size of between 50 and 900 microns; and
    microfiltration membrane separation means operable to filter the suspended solids from some or all of the screened effluent without an intermediate long term biological treatment stage.

18. An apparatus according to claim 17 further comprising second membrane separation means operable to filter selected soluble substances from some or all of the effluent from the first membrane separation means.

19. An apparatus according to claim 18 further comprising chemical dosing means to treat the effluent from the first membrane separation stage so as to prevent precipitation of soluble organic substances in solution.

20. An apparatus according to claim 17 including means to periodically wash or back-wash the screening and membrane separation stage or stages and return the washing media and accumulated solids back to the sewer.

21. An apparatus according to claim 20 including means to direct the washing media back to the sewer in a manner whereby it assists in cleaning the screen.

22. An apparatus according to claim 17 wherein the screen aperture sizes are in the range of 200 to 250 microns.

23. An apparatus according to claim 20 wherein the washing media includes chemical cleaning agents.

24. An apparatus according to claim 17 wherein the screening device is designed for use within the sewer main or a well diverted directly from the sewer main.

25. An apparatus according to claim 17 wherein the screening means comprises a static screen.

26. An apparatus according to claim 17 wherein the screening means comprises a dynamic screen such as a rotating belt or drum screen.

27. An apparatus according to claim 17 wherein the screening means includes washing nozzles or jets that direct water and/or air or other washing medium to the screen.

28. An apparatus according to claim 17 further including a short residence time trickle bed suspended growth filter arrangement disposed prior to the first membrane separation stage.

29. An apparatus according to claim 17 further comprising means to dose the screened effluent with a coagulant prior to the first membrane separation means.

30. An apparatus according to claim 17 further comprising sterilisation means disposed to treat the effluent from the first or second membrane separation means.

31. An apparatus according to claim 17 further comprising means to disinfect the effluent from the first membrane separation process to prevent biogrowth in the second membrane separation process.

* * * * *